(12) United States Patent
Richards

(10) Patent No.: US 10,168,202 B2
(45) Date of Patent: Jan. 1, 2019

(54) SELF-COMPENSATING WEIGHT SENSING FORK BLADE ASSEMBLY

(71) Applicant: Cascade Corporation, Fairview, OR (US)

(72) Inventor: Lawrence E. Richards, Springfield, OH (US)

(73) Assignee: Cascade Corporation, Fairview, OR (US)

( * ) Notice: Subject to any disclaimer, the term of this patent is extended or adjusted under 35 U.S.C. 154(b) by 66 days.

(21) Appl. No.: 15/370,540

(22) Filed: Dec. 6, 2016

(65) Prior Publication Data

US 2018/0156656 A1    Jun. 7, 2018

(51) Int. Cl.
  *B66F 17/00*    (2006.01)
  *B66F 9/12*    (2006.01)
  *G01G 19/08*    (2006.01)

(52) U.S. Cl.
  CPC ............. *G01G 19/083* (2013.01); *B66F 9/12* (2013.01); *B66F 17/003* (2013.01)

(58) Field of Classification Search
  CPC ........ B66F 9/12; B66F 17/003; G01G 19/083
  USPC ........................................................ 177/139
  See application file for complete search history.

(56) References Cited

U.S. PATENT DOCUMENTS

| | | |
|---|---|---|
| 3,059,710 A | 10/1962 | Pien |
| 3,063,576 A | 11/1962 | Hofmeister |
| 4,420,053 A | 12/1983 | Russo |
| 4,421,186 A | 12/1983 | Bradley |
| 4,666,004 A | 5/1987 | Raz |
| 4,854,406 A | 8/1989 | Appleton et al. |
| 4,899,840 A | 2/1990 | Boubille |
| 5,724,267 A * | 3/1998 | Richards .............. G01G 3/1416 177/164 |
| 5,922,998 A | 7/1999 | Zefira |
| 5,986,560 A | 11/1999 | Rayburn |
| 6,600,111 B2 | 7/2003 | Simons |
| 6,730,861 B1 | 5/2004 | Simons |

(Continued)

FOREIGN PATENT DOCUMENTS

| | | |
|---|---|---|
| DE | 3802332 A1 | 8/1989 |
| EP | 1200298 B1 | 1/2009 |

(Continued)

OTHER PUBLICATIONS

International Search Report and Written Opinion dated May 20, 2015, PCT International App. No. PCT/US2015/016657, Cascade Corporation, 6 pgs.

(Continued)

*Primary Examiner* — J M Saint Surin
(74) *Attorney, Agent, or Firm* — Chernoff, Vilhauer, McClung & Stenzel, LLP

(57) ABSTRACT

A load-weighing assembly has a substantially laterally-extending beam-type load-weighing platform, and a substantially laterally-extending cantilever-type fork blade member located beneath the platform, interconnected by a load weight-measuring cell. The weight measuring cell is laterally movable with respect to at least one of the platform and blade member during an initial part of a load weighing process so as to minimize transmission of lateral force between the platform and the weight-measuring cell, thereby compensating for load-weighing errors which would otherwise occur.

4 Claims, 3 Drawing Sheets

(56) References Cited

U.S. PATENT DOCUMENTS

| | | | |
|---|---|---|---|
| 6,855,894 B1 | 2/2005 | Van Seumeren | |
| 7,140,242 B1* | 11/2006 | Poling, Sr. | G01M 17/022 73/146 |
| 7,669,486 B2* | 3/2010 | Simons | G01G 19/083 73/862.636 |
| 8,452,525 B2* | 5/2013 | Sendlinger | G01M 1/125 244/108 |
| 8,853,568 B2* | 10/2014 | Shinozaki | G01G 21/28 177/210 FP |
| 9,316,528 B2 | 4/2016 | Richards et al. | |
| 2001/0041820 A1 | 11/2001 | Woo | |
| 2008/0178690 A1 | 7/2008 | Simons | |
| 2011/0067502 A1 | 3/2011 | Simons | |
| 2013/0015004 A1 | 1/2013 | Simons | |
| 2014/0069728 A1* | 3/2014 | Lustenberger | G01G 19/12 177/1 |
| 2014/0224588 A1 | 8/2014 | Van Seumeren | |
| 2015/0344277 A1 | 12/2015 | Simons | |
| 2015/0368081 A1 | 12/2015 | van Seumeren | |

FOREIGN PATENT DOCUMENTS

| | | |
|---|---|---|
| WO | 0103990 A1 | 1/2001 |
| WO | 2008134877 A1 | 11/2008 |
| WO | 2010140880 A2 | 12/2010 |
| WO | 2013006038 A1 | 1/2013 |
| WO | 2014003569 A1 | 1/2014 |

OTHER PUBLICATIONS

"i-Forks," Cascade Corporation, Feb. 2011, 5 pgs.

United States Patent and Trademark Office, Commissioner for Patents, Notification of Transmittal of The International Search Report and The Written Opinion of the International Searching Authority, or the Declaration, dated Jul. 21, 2017, 1 pg, Alexandria, VA.

United States Patent and Trademark Office, International Search Report, dated Jul. 21, 2017, 2 pgs., Alexandria, VA.

United States Patent and Trademark Office, Written Opinion of the International Searching Authority, dated Jul. 21, 2017, 6 pgs, Alexandria, VA.

* cited by examiner

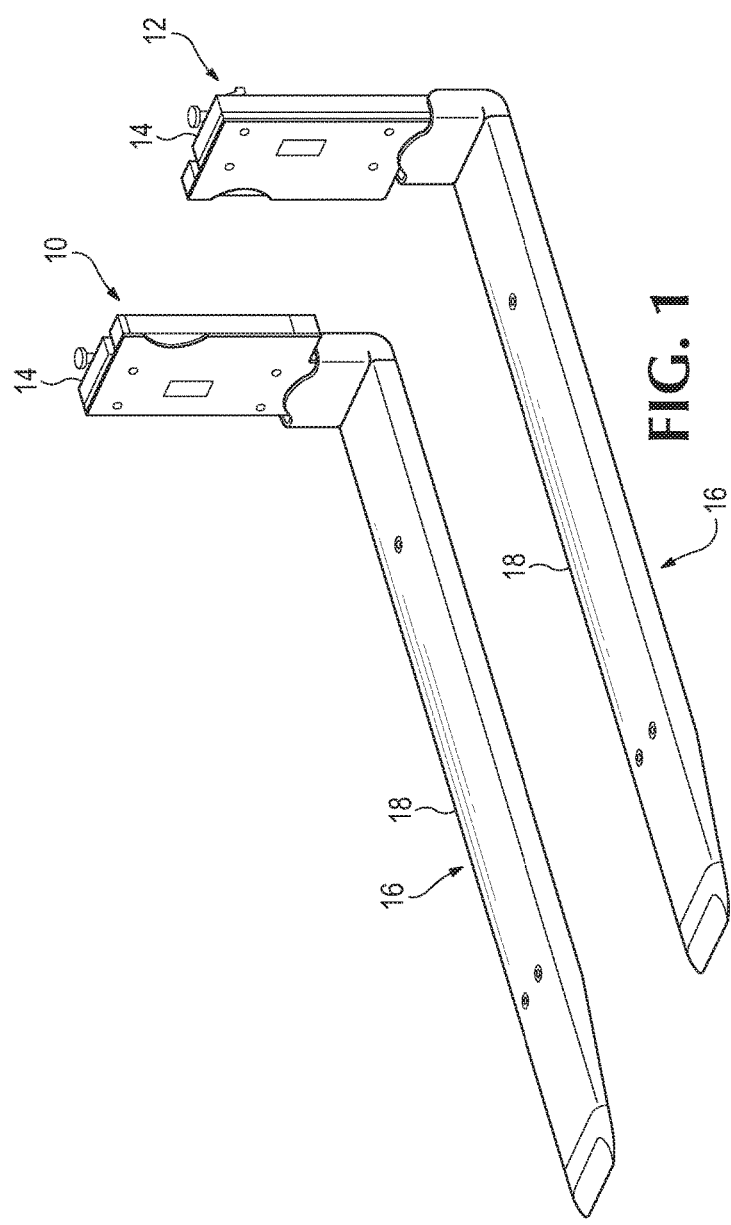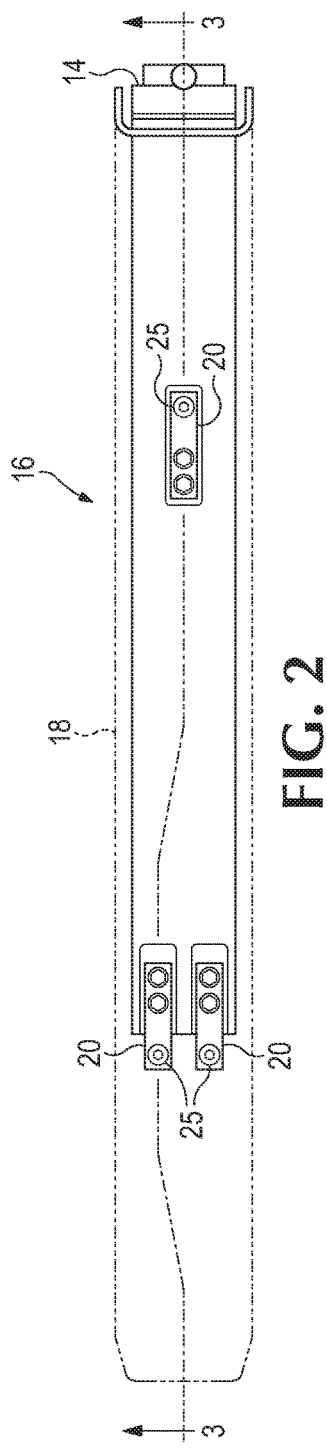

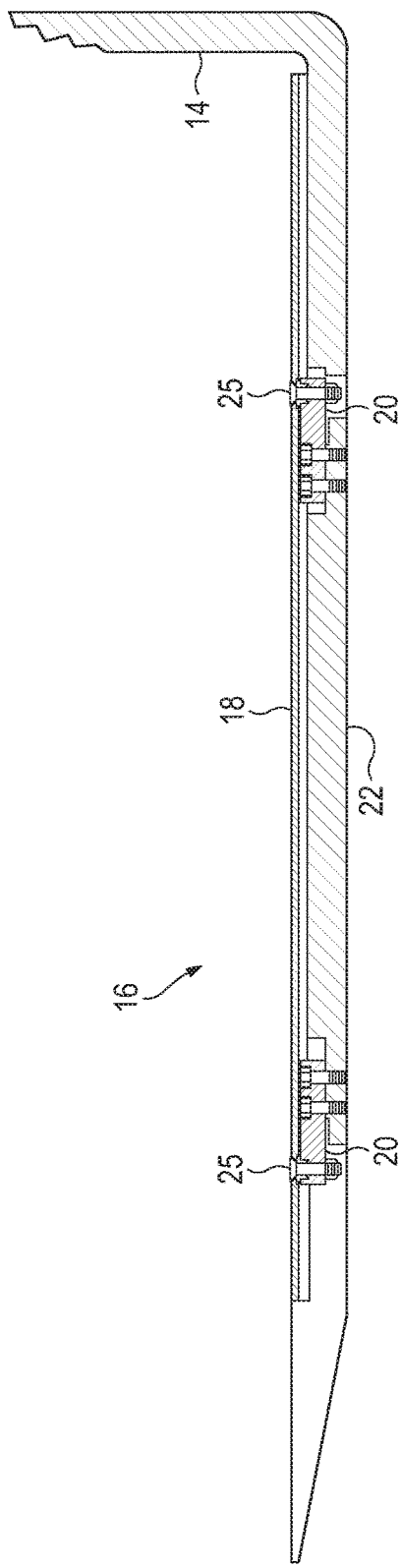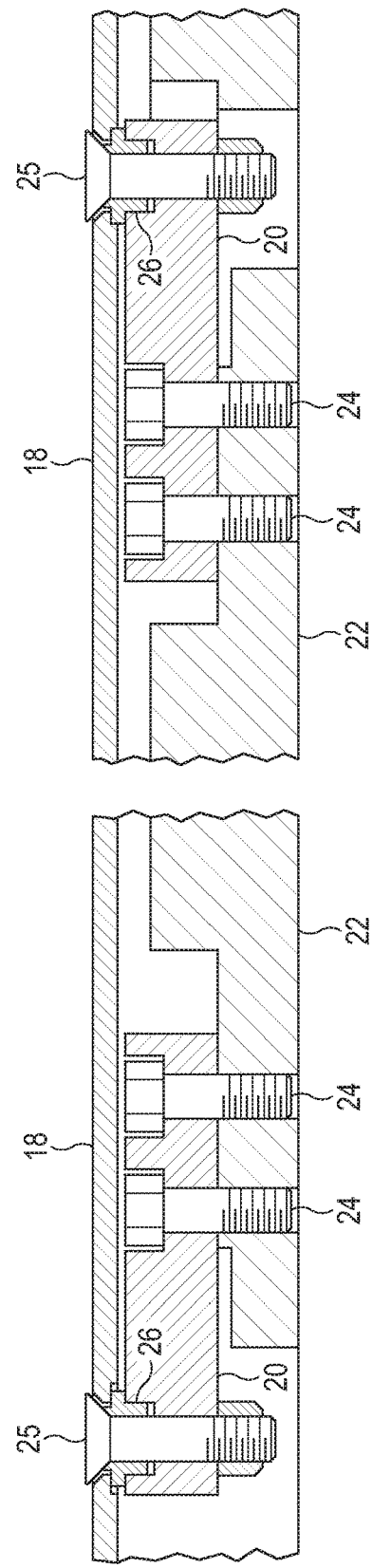

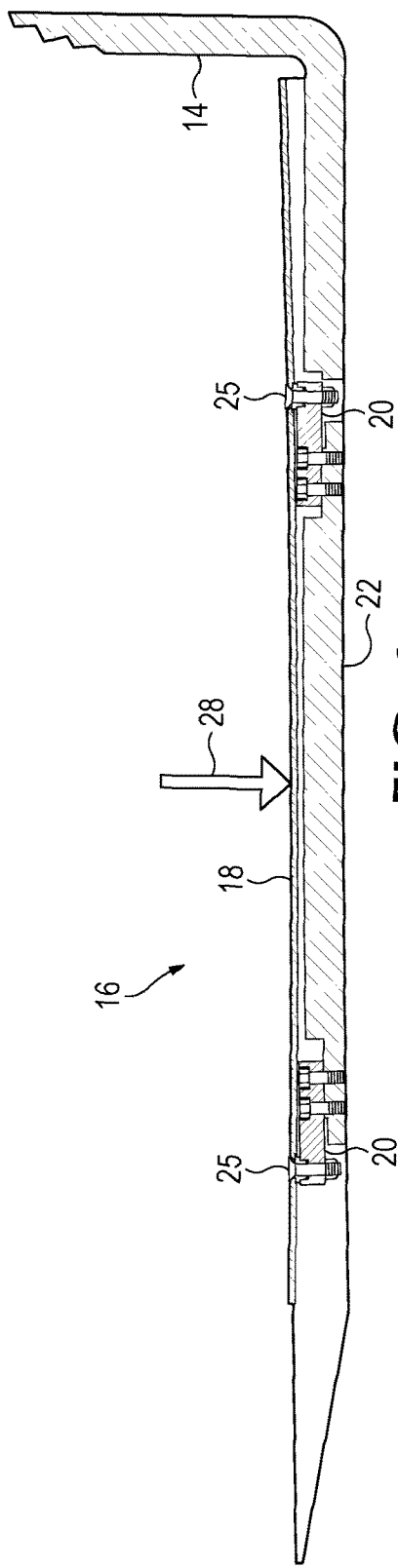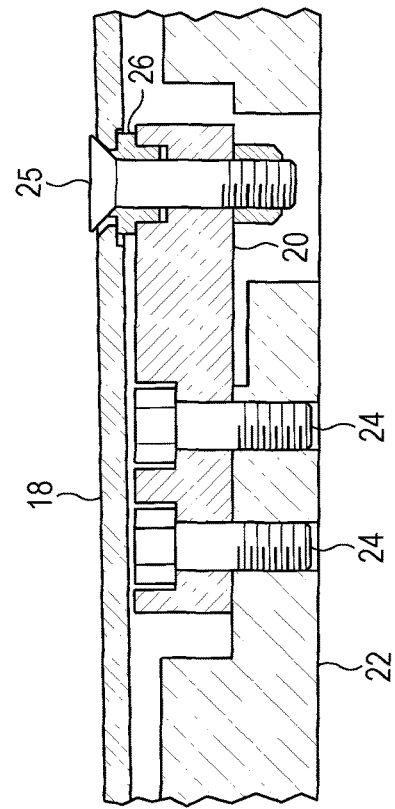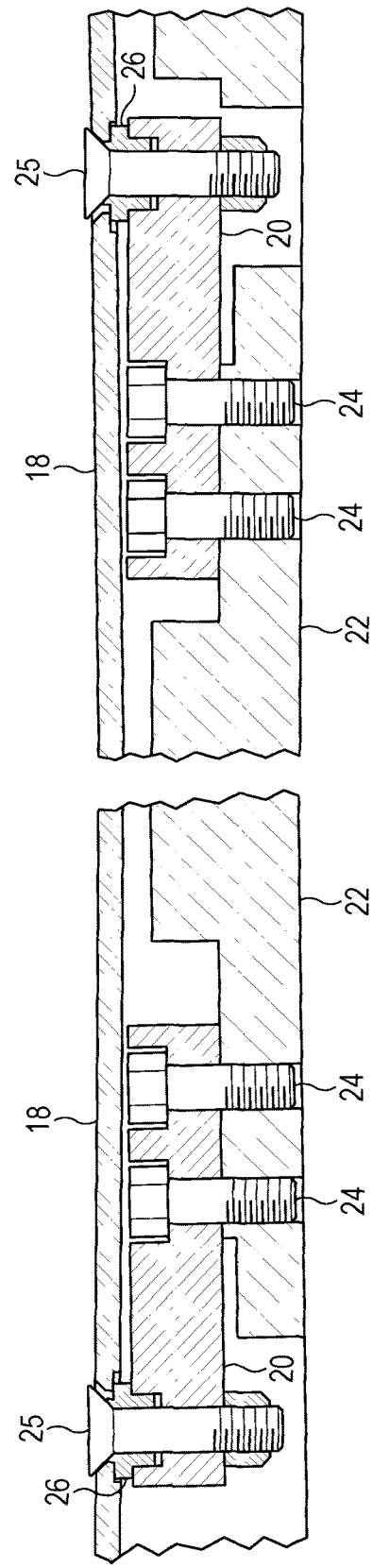

SELF-COMPENSATING WEIGHT SENSING FORK BLADE ASSEMBLY

CROSS-REFERENCE TO RELATED APPLICATIONS

None.

BACKGROUND OF THE INVENTION

This invention relates to improvements in load-weight sensing systems for lift trucks and other similar load supporting apparatus. Such previous load-weight sensing systems commonly employ electrical load-weight measuring cells, sometimes referred to as strain gauges, interconnecting an underlying cantilever-type load-supporting fork blade member with an overlying simple beam-type load weighing platform. Some such prior systems, as exemplified by U.S. Pat. No. 9,316,528 and other references cited therein, use bendable elongate beam-type load-weight measuring cells. Other prior systems, as exemplified by US published patent applications 2007/0041820 A1 and 2011/0067502 A1, use other types of load-weight measuring cells. Any of such types of prior load-weight measuring cells can be used in the present invention, and are intended to be included herein.

In the present invention, the weight of the load elastically deforms the overlying load weighing platform and the underlying fork blade member downwardly in variable response to the weight of the load. However, the overlying load weighing platform is deformed downwardly differently than the underlying fork blade member, because the overlying platform is not supported in a cantilever fashion as is the underlying fork blade member. Instead the overlying platform is supported by weight-measuring cells in positions adjacent to the load weighing platform's forward and rearward extremities, respectively. This inconsistency results in stressing of the load-weighing platform as a simple beam supported at both ends, while simultaneously stressing the underlying fork blade member as a cantilever beam. Such difference in stressing causes lateral misalignments of the above-described load cells relative to the load-weighing platform, which then causes errors in the sensed load weight because the misalignments introduce load-cell-deforming stresses which are additional to the load weight-caused stresses. The purpose of the present invention is to minimize these error-causing load weight-sensing problems, as well as to minimize the adverse operational and economic effects that result from such problems, by automatically compensating for them.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a perspective view of an exemplary pair of weight-sensing fork blade assemblies in accordance with the present invention.

FIG. 2 is a top view of one of the weight-sensing fork blade assemblies of FIG. 1, with its top removed to show exemplary underlying structure.

FIG. 3 is a simplified schematic sectional view of the exemplary weight-sensing fork blade assembly of FIG. 2, taken along line 3-3 of FIG. 2 and shown in an unloaded condition.

FIG. 4 is an enlarged longitudinal sectional view of the unloaded forward load weight measuring cell shown in FIG. 3.

FIG. 5 is an enlarged longitudinal sectional view of the unloaded rearward load weight measuring cell shown in FIG. 3.

FIG. 6 is a simplified schematic sectional view of the weight-sensing fork blade assembly of FIG. 2, taken along line 3-3 of FIG. 2 and shown in a loaded condition.

FIG. 7 is an enlarged longitudinal sectional view of the loaded forward load weight measuring cell shown in FIG. 6.

FIG. 8 is an enlarged longitudinal sectional view of the loaded rearward load weight measuring cell shown in FIG. 6.

DETAILED DESCRIPTION OF PREFERRED EMBODIMENT

FIG. 1 shows an example of a pair of load-weighing fork assemblies 10 and 12, each having a pair of upright portions 14 which are mountable on a load-lifting carriage of a conventional lift truck (not shown). The fork assemblies 10 and 12 are preferably each L-shaped so as to define forwardly extending load-supporting portions 16, as exemplified in FIG. 1, for insertion beneath a load to selectively lift or lower the load.

Because the fork assemblies 10 and 12 are intended to have a load-weighing function in addition to their load-lifting and lowering function, they are equipped with respective load-weighing platforms 18 as shown in FIG. 3 which are supported by respective electric load-weight measuring strain-gauge cells 20 atop fork blade members 22, as shown in FIGS. 2 and 3 and in greater detail in FIGS. 4 and 5. Previously, the respective load-weight measuring cells 20 had been tightly fastened to the load-weighing platforms 18 and to the fork blade members 22 by bolts such as 24, 25. However, the accuracy of such a load weighing system had been problematic in use. This was due to the fact that, when a load was supported on the load-weighing platforms members 18 with the foregoing tight fastening of the load-weight measuring cells 20 to both the fork blade members 22 and to the load weighing platforms 18, the load's weight caused the load-weighing platform 18, as well as its underlying fork blade member 22, to deform variably and unpredictably in response to the weight of the load.

In contrast, in accordance with the present invention, it has been discovered that a slight loosening of the fastening of a load-weight measuring cell 20 with respect to either a load weighing platform 18 or a fork blade member 22, while maintaining the opposite fastening tight, provides a significant improvement.

FIGS. 6-8 exemplify the foregoing desired result by illustrating a typical load-weight sensing fork blade assembly's operation in accordance with the present invention. In FIG. 6, the fork blade member 22 and the load-weighing platform 18 have been deformed downwardly by a load weight indicated as 28. The fork blade member 22 has been deformed downwardly in a cantilever fashion, while the load-weighing platform 18 has been deformed downwardly as a simple beam supported at opposite ends by load cells 20 connected to the platform 18 by bolts 25. The respective load-induced curvatures of the two structures 18 and 22 are unequal and opposite to each other as a result of their different loadings, as exemplified in FIG. 6. This unequal arrangement places unequal lateral stresses on the bolts 25, induced by the dissimilar curvatures and strengths of the two beam structures 18 and 22.

However, if the bolts 25 are loosened slightly, in accordance with the present invention as exemplified in FIGS. 4 and 5, so as to provide small gaps which permit resultant small relative movements in the tapered head regions of the bolts 25 with respect to the load-weight measuring cells 20 during their initial load-induced downward movements, the difference between the unequal stresses caused by the dissimilarities of the two beam structures 22 and 18 can be reduced or eliminated. Thereafter, as further bending of the two beam structures 18 and 22 occurs, the initial looseness of the bolts 25 is terminated by contact of the undersides of their bolt heads with the load-weighing platform 18 and b contact of the underside of the load-weighing platform 18 with collars 26 rigidly mounted on the load-weight measuring cells 20, which thereby prevents the load-weighing platform 18 from moving further downward with respect to the load-weight measuring cells 20, as shown in FIGS. 7 and 8.

Lateral movement of the load-weight measuring cells 20 is simultaneously also prevented by the collars 26 in the case of each rearward bolt 25 as seen in FIG. 7. However, the forward transversely separated collars 26 are not secured so as to prevent their lateral movement, instead being loosely held laterally by the load-weighing platform 18 as shown in FIG. 8 so as to promote equal support of the load. The foregoing arrangement has been found to enable the angular misalignment of the load-weighing platform 18 relative to the beam structures 20 and 22 without thereby significantly affecting the load-weighing accuracy of the system.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A load-weighing assembly for a bad lifting system, said load-weighing assembly having a substantially laterally-extending load-weighing platform, and a substantially laterally-extending cantilever fork blade member located beneath said platform, said load-weighing platform and said cantilever fork blade member being interconnected by a load weight-measuring cell which is configured to move laterally with respect to at least one of said load-weighing platform and said cantilever fork blade member during an initial part of said load weighing so as to minimize transmission of lateral force between said load-weighing platform and said load weight-measuring cell during said initial part of said load weighing, said load weight-measuring cell being loosely connected to said laterally extending load-weighing platform at least during said initial part of said load weighing.

2. The load-weighing assembly of claim 1 wherein, during a subsequent part of said load weighing, said load-weighing assembly automatically prevents said weight-measuring cell from moving laterally.

3. The load-weighing assembly of claim 1, wherein said cantilever fork blade member is an elongate cantilever member which supports said load-weighing platform at multiple laterally separated positions along said cantilever fork blade member.

4. The load-weighing assembly of claim 1 including a plurality of said load-weight measuring cells loosely connected to said laterally extending load-weighing platform during said initial part of said load weighing.

* * * * *

UNITED STATES PATENT AND TRADEMARK OFFICE
CERTIFICATE OF CORRECTION

| | | |
|---|---|---|
| PATENT NO. | : 10,168,202 B2 | Page 1 of 1 |
| APPLICATION NO. | : 15/370540 | |
| DATED | : January 1, 2019 | |
| INVENTOR(S) | : Lawrence E. Richards | |

It is certified that error appears in the above-identified patent and that said Letters Patent is hereby corrected as shown below:

In the Specification

Column 2, Lines 39-40: Delete "members";

Column 3, Line 12: Delete "and b" and replace with --and by--; and

In the Claims

Column 4, Line 4: Delete "bad" and replace with --load--.

Signed and Sealed this
Twenty-second Day of October, 2019

Andrei Iancu
*Director of the United States Patent and Trademark Office*